July 16, 1935.
H. J. STOEVER
2,008,407
INVERTED REFRIGERATION PLANT
Filed April 28, 1932
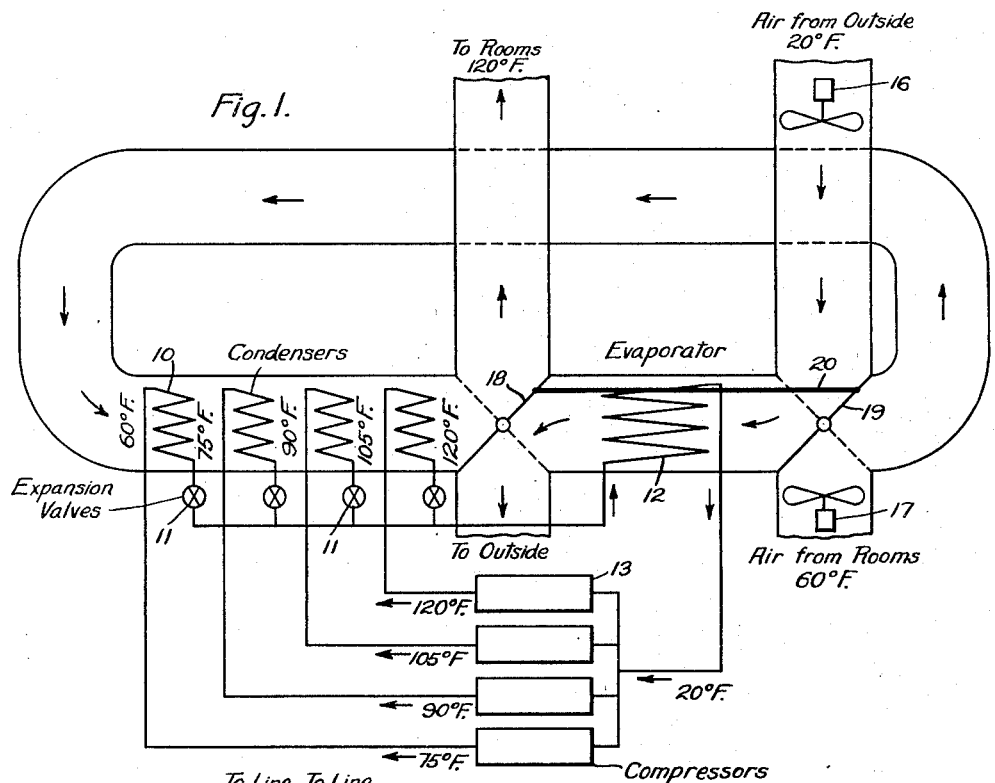
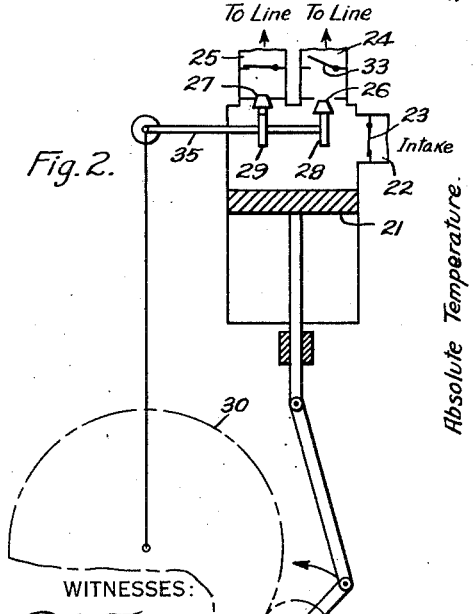
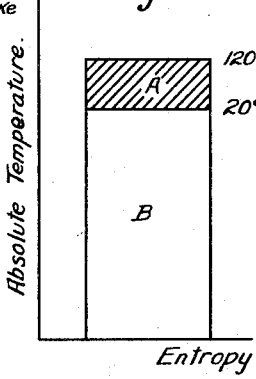
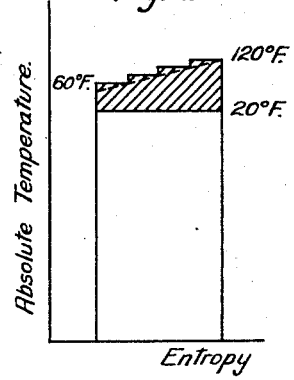
INVENTOR
Herman J. Stoever.
BY O. B. Buchanan.
ATTORNEY Patented July 16, 1935

2,008,407

UNITED STATES PATENT OFFICE 2,008,407

INVERTED-REFRIGERATION PLANT

Herman J. Stoever, Wilkinsburg, Pa., assignor to Westinghouse Electric & Manufacturing Company, East Pittsburgh, Pa., a corporation of Pennsylvania Application April 28, 1932, Serial No. 607,940

5 Claims. (Cl. 62—115)

My invention relates to means and methods for utilizing a reversed refrigeration cycle for the heating of bodies, such as houses, and it has particular relation to an improvement in the efficiency of the heating cycle of such an inverted-refrigeration plant.

The possibility of using the refrigeration cycle for the air conditioning of homes in both winter and summer has attracted considerable attention during the last few years, with particular reference to those sections of the country which require cooling of the homes in summer, and only a small amount of heating for a relatively few days in winter. These so-called "inverted-refrigeration" plants may be expected to be entirely automatic, perfectly clean, and to eliminate the need of fuel storage space and even the need of a basement itself.

Apparently all of the plants heretofore built or proposed for either refrigeration or heating operate on the usual compression cycle which approaches the performance of the Carnot cycle, since the vaporizable heat-exchange medium used undergoes two isothermal changes and two other changes which tend to be at constant entropy.

This Carnot cycle, when utilized for refrigeration, has its maximum efficiency when all portions of the condenser are at substantially the same temperature, which is as low as possible, and when all portions of the evaporator are at substantially the same temperature, which is as high as possible, being necessarily lower than the temperature of the condenser. Accordingly, refrigerating apparatus employing the usual compression cycle have been built and more or less standardized so as to approach this Carnot cycle as closely as possible.

When the cycle has been reversed, in order to secure house-heating in winter, it has heretofore been the universal practice to utilize the same equipment. This has the disadvantage, however, that the condenser, for satisfactory house-heating, must be operated at a relatively high temperature, so that the temperature-difference between the condenser and the evaporator, which represents the power input necessary to operate the cycle, is relatively great, making the efficiency very poor.

It is an object of my invention to overcome this difficulty, and to cause the efficiency to approach the ideal maximum possible value, by providing a plurality of condensers which operate at successively higher temperatures, so that the house-heating medium, in passing over the condensers in series, is heated in stages, so that, while the last one of the condensers operates at the above-mentioned poor efficiency, the other condensers operate at much better efficiencies, thereby increasing the over-all efficiency of the plant, during the heating cycle.

A further object of my invention is to provide an improved compressor which is capable of supplying a gas or vapor to several lines at different pressures simultaneously.

With the foregoing and other objects in view, my invention consists in the apparatus and systems hereinafter described and claimed and illustrated in the accompanying drawing, wherein Figure 1 is a diagrammatic plan view illustrating my invention in a preferred form of embodiment;

Fig. 2 is a diagrammatic, sectional view of my improved compressor; and

Figs. 3 and 4 are entropy diagrams hereinafter referred to.

In the inverted-refrigerator plants for house-heating, the evaporator is heated by the outside air and the condenser supplies heat to the air which is blown into the rooms, or to some other heat-transfer medium for transferring the heat to the rooms. The performance of such a plant is measured by a quantity called the "coefficient of performance" and is defined as the ratio of the total heat supplied to the house divided by the heat equivalent of the electrical energy consumed by the plant. For example, if the coefficient of performance is equal to 5, then 5 k. w. h. of heat are supplied to the house for every one k. w. h. of electrical energy consumed. This apparently absurd performance is explained, of course, by the fact that 4 k. w. h. of heat flow from the outside air to the refrigerant in the evaporator. A graphical interpretation of this coefficient is very useful and can be obtained by plotting the cycle on the temperature-entropy plane. Figure 3 shows an ideal Carnot cycle. The shaded area A represents the heat equivalent of the electrical energy consumed, area B represents the heat supplied to the system by the outside air, and the total area (A+B) represents the heat rejected by the system to the house. The coefficient of performance, then, is the ratio of the total area (A+B) to the shaded area A. Assuming the outdoor air temperature to be 20° F. and the air being circulated from the house to be heated to 120° F., the value of this coefficient for the ideal case shown is 5.8

The performance of an actual plant is not as good as that of an ideal plant operating between the same temperature limits, for several reasons.

In order for heat to flow from the outside air at 20° F. to the refrigerant within the evaporator coils, a temperature gradient must exist, i. e., the refrigerant must be at a temperturae lower than 20° F. Similarly, the refrigerant in the condenser must be at some temperature higher than 120° F. if the air is to be heated to this desired temperature. It is evident that the coefficient of performance is decreased by these changes since the shaded area in Figure 3 is increased. Besides the necessity of temperature gradients, neither the compression nor the expansion takes place in the frictionless, adiabatic manner assumed in Figure 3. The fact that the vapor is superheated on being compressed further reduces the coefficient of performance. Finally, the inefficiencies of the compressor and of the motor must be considered, so that the coefficient for an actual plant operating between the temperatures assumed would probably be only about 2.4 instead of 5.8 as for the Carnot cycle.

The Carnot cycle just described is not the most efficient cycle for the conditions which exist in the inverted-refrigeration plant. The most efficient, ideal cycle for the inverted-refrigeration plant would be that shown by dotted line in Fig. 4, wherein the air which is taken from the room at, say, 60° F. is gradually heated up to its desired temperature of, say, 120° F., by means of a heat-exchange medium which is at all points at the same temperature as the air in contact therewith. This new cycle has a coefficient of performance equal to 8.0, for the assumed conditions, as compared to 5.8 for the Carnot cycle operating between the maximum temperature limits of 120° F. and 60° F. However, the new cycle represented by the dotted line in Fig. 4 would be rather difficult to follow in actual practice, for various reasons which need not be gone into now.

I believe that the most practicable approach to the ideal cycle shown in dotted line in Fig. 4 is obtained by my invention, which is shown in Fig. 1. In the apparatus therein shown, air is withdrawn from the rooms, or obtained from outside the house, or from a mixture of the two sources, and is passed over two or more condensers 10 in series, said condensers operating at successively higher temperatures, until the air is finally heated to the desired temperature, which has been assumed to be 120° F., at which it is to be supplied to the rooms for heating. Otherwise, the system is the same as the usually employed reversed-refrigeration cycle. That is, each of the condensers 10 is provided with an expansion valve 11, wherein the vaporizable heat-exchange medium which is liquefied in the condenser is expanded at approximately constant entropy, and discharged into an evaporator 12 which is placed within a blast of air from outside of the house. The saturated vapor leaving the evaporator enters the intake duct of one or more compressors 13, each of which steps up the pressure to whatever the pressure is in the particular condenser 10 to which it is connected, the pressures in the condensers being determined, of course, by the temperature at which the condenser is maintained by the flow of air past its surfaces. Thus, the first condenser 10 may operate at a temperature of 75° F., which requires a relatively small amount of compression of the heat-exchange medium. Successive condensers operate at increasingly high temperatures, as indicated, until the last condenser 10 is reached, which operates at the highest pressure of them all, corresponding to a temperature of, say, 120° F.

By virtue of the utilization of a plurality of condensers operating at different temperatures, I am enabled to utilize the cycle shown in full lines in Fig. 4, said cycle consisting simply of as many Carnot cycles as there are condensers. The cycle approaches nearer and nearer to the ideal dotted-line cycle as the number of condensers is increased, but it would probably be true that most of the advantage could be gained by not more than three or four stages, four being shown. The theoretical coefficient of performance for the plant using four condensers as shown, and operating under the same conditions of temperature as in the Carnot cycle of Fig. 3, is about 7.2 as compared to 8.0 for the dotted-line ideal cycle of Fig. 4, and 5.8 for the Carnot cycle of Fig. 3.

Calculations based on identical assumptions as to temperature gradients, compressor and motor efficiencies, etc. show that an actual plant utilizing only one condenser would require slightly over 20% more power for the same amount of heat supplied to the house at the same maximum temperature as would my plant utilizing four condensers as shown in Figure 1.

When the cycle is used for refrigeration, the outside air is passed over the condensers 10, and the inside air is passed over the evaporator 12 so as to be cooled, or else the direction of flow of the heat-exchange medium is reversed, so that the evaporator 12 becomes a condenser and the condensers 10 become evaporators. For the refrigerating cycle it is desired to keep all of the condensers as cold as possible, instead of having the condensers operate at successively hotter temperatures, and this is effected by causing the air blast which blows over them to flow at a sufficiently high velocity.

In general, the blower which is utilized to produce the blast of outside air, as indicated at 16, will have a larger capacity than the blower for producing the flow of inside air, as indicated at 17, so that when the outside air is caused to pass over the condenser 10, it will automatically do so at a higher velocity than when the inside air is caused to pass thereover, as in the inverted cycle for heating.

As shown in Fig. 1, a suitable arrangement of interconnected ducts may be provided whereby two interconnected dampers 18 and 19 may be moved, by a common handle 20, from full-line position, for heating, to the dotted-line position, for the cooling cycle.

The compressor or compressors may be of the piston type shown in Fig. 2, wherein a piston 21 draws the fluid through an intake pipe 22 and an intake valve 23, during the down stroke of the piston, and forces it out during its up stroke. As shown in Fig. 2, a plurality of outlet lines or pipes 24 and 25 may be utilized, only two being illustrated for the sake of simplicity. Each of these lines is connected to a separate condenser, so that the fluid pressure in each line is different. In order to control the admission of fluid from the pump to the respective lines 24 and 25, I may utilize cam or gear-controlled poppet valves 26 and 27, which are illustrated as being operated by cams 28 and 29 which are driven from suitable gearing 30 from the pump shaft 31.

The cams 28 and 29 are so shaped that only one of the poppet valves 26 and 27 is open during any compression or up-stroke of the piston 21. When the fluid pressure in the piston reaches a sufficiently high value to overcome the fluid pressure in the line to which it is connected by the poppet valve which is open at the particular moment, for instance, the line 24 and the poppet valve 26, an ordinary exhaust valve 33, which is provided in the line, opens and permits fluid to flow from the pump into the line. Thus, in operation, the compressor discharges first into one line and then into another, each line being allowed to assume whatever pressure it will, said pressure being determined by the temperature of the condenser 10 to which it is connected. The number of strokes discharged into each individual line can be controlled by the shape of the cams 28 and 29 and by the speed of the cam-shaft 35, which is, in turn, controlled by the gearing 30.

I am aware that several variations of the system described are possible without departing from the essential features of my invention, and I desire, therefore, that the appended claims be accorded the broadest construction consistent with their language and the prior art.

I claim as my invention:

1. A reversible refrigerating system for either heating or cooling, comprising, in a combination utilizing a vaporizable heat-exchange medium, a plurality of condensers, an expansion valve for each condenser, evaporator means, and compressor means capable of supplying the vaporizable heat-exchange medium to the several condensers at successively higher temperatures.

2. An inverted-refrigeration plant for house-heating, comprising, in a combination utilizing a vaporizable heat-exchange medium, a plurality of condensers, an expansion valve for each condenser, evaporator means, compressor means for supplying the vaporizable heat-exchange medium to the several condensers at successively higher temperatures, a fluid heat-transfer medium for transferring the heat from the condensers to a room of the house, and means for passing said heat-transfer medium over said condensers in series at such rate that said heat-transfer medium is heated in stages as it passes from the least hot to the hottest of said condensers.

3. An inverted-refrigeration plant for house-heating, comprising, in a combination utilizing a vaporizable heat-exchange medium, a plurality of condensers, an expansion valve for each condenser, evaporator means, compressor means for supplying the vaporizable heat-exchange medium to the several condensers at successively higher temperatures, and means for passing air over said condensers in series and thence on into a room of the house at such rate that said air is heated in stages as it passes from the least hot to the hottest of said condensers.

4. A reversible refrigerating system for either heating or cooling, comprising, in a combination utilizing a vaporizable heat-exchange medium, a plurality of condensers, an expansion valve for each condenser, an evaporator, and compressor means for withdrawing the vaporizable heat-exchange medium from said evaporator and intermittently supplying it, at different pressures, to different ones of said condensers, whereby the several condensers receive said vaporizable heat-exchange medium at different temperatures.

5. A reversible refrigerating system for either heating or cooling, comprising, in a combination utilizing a vaporizable heat-exchange medium, a plurality of condensers, an expansion valve for each condenser, an evaporator, and a fluid compressor or pump comprising a single pressure-producing means, a plurality of outlet lines for connecting said single pressure-producing means to said plurality of condensers, respectively, said condensers being so disposed that they operate at a plurality of different temperatures, closure means for the several outlet lines, and means for intermittently opening different ones of said closure means.

HERMAN J. STOEVER.